Patented Apr. 27, 1954

2,676,966

UNITED STATES PATENT OFFICE 2,676,966

QUATERNARY SALTS OF 9-CARBAZOLEAL-KYLAMINES AND 10-ACRIDANALKYLA-MINES AND METHODS FOR PREPARING SAME

John W. Cusic, Skokie, Richard A. Robinson, Morton Grove, and Clinton A. Dornfeld, Mundelein, Ill., assignors to G. D. Searle & Co., Chicago, Ill., a corporation of Illinois No Drawing. Application April 4, 1951, Serial No. 219,306

12 Claims. (Cl. 260—279)

The present invention is concerned with a new class of quaternary ammonium salts, and more particularly with those of the N-alkylamine derivatives of carbazole and acridan. The salts which constitute our invention are represented by the structural formula

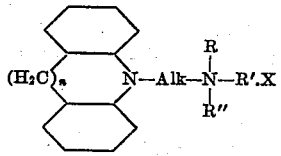

wherein $n$ is either zero or one, Alk is a lower saturated bivalent aliphatic hydrocarbon radical, R is a member of the class consisting of alkyl, aralkyl, alkenyl, and hydroxyalkyl radicals; and X is one equivalent of an anion. NR'R'' is a member of the class consisting of saturated nitrogen-containing heteromonocyclic radicals, attached to the Alk group through the nitrogen in the heteromonocycle, and of disubstituted amino radicals wherein R' and R'' are members of the same class as R.

In the foregoing structural formula, Alk represents a bivalent saturated hydrocarbon radical of from two to eight carbon atoms. The radicals are derived from straight-chain or branched-chain aliphatic hydrocarbons and include such radicals as ethylene, propylene, butylene, amylene, hexylene, and polymethylenes from trimethylene to octamethylene.

Among the radicals which R, R' and R'' represent are such lower alkyl groups as methyl, ethyl, propyl, butyl, amyl, hexyl, hydroxyethyl, hydroxypropyl, hydroxybutyl, hydroxyamyl, and hydroxyhexyl, wherein the propyl, butyl, amyl, and hexyl groups may be either of the straight-chain or branched-chain type. Further, these radicals may be of the unsaturated type as in the case of allyl, crotyl, methallyl, other butenyl and pentenyl radicals, and the like. The radical NRR' may also be a nitrogen-containing heteromonocyclic radical such as piperidine, lupetidine, pyrrolidine, morpholine, thiamorpholine, piperazine and the like. The radical X represents one equivalent of an anion such as fluoride, bromide, chloride, iodide, sulfate, phosphate, citrate, oxalate, ascorbate, sulfamate, methosulfate, ethosulfate, and benzenesulfonate. The quaternary compounds which constitute this invention are synthesized most conveniently from the tertiary bases of the type

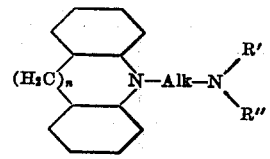

all symbols being defined as hereinabove. These tertiary bases are obtained conveniently by condensation of a cyclic base of the type

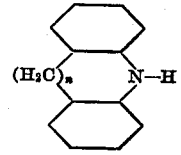

with a haloalkylamine derivative of the type

Y—Alk—NR'R''.HX wherein X and Y are halogen radicals, using strong alkali and an inert anhydrous organic solvent such as a lower aromatic hydrocarbon. An alternate condensation process utilizes a halide of the type

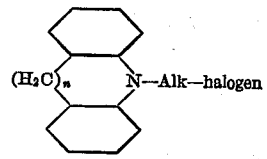

and the amine HNR'R'' in the presence of an anhydrous inert organic solvent such as a lower aromatic hydrocarbon.

The tertiary bases thus obtained are quaternized by treatment with organic esters of sulfuric, hydrohalic, aromatic sulfonic, and related acids. Among such esters are the methyl halides, ethyl halides, propyl halides, isopropyl halides, and other alkyl halides, benzyl halides, phenethyl halides, naphthylmethyl halides, dimethyl sulfate, diethyl sulfate, methyl benzenesulfonate, ethyl toluenesulfonate, ethylene halohydrins, propylene halohydrins, and related alkylene halohydrins, allyl halides, methallyl halides and crotyl halides. By this quaternization process, the tertiary bases are converted to compounds of a different and highly valuable therapeutic activity. Thus the quaternary salts which constitute this invention are active cardiovascular agents capable of producing a pronounced degree of vasodilatation and of decreasing pathologic levels of blood pressure. They are also active in preventing the transmission of sympathetic and parasympathetic autonomic nerve impulses through the ganglia. Some find their use as parasiticidal agents.

Our invention will be described more fully in conjunction with the following examples. It will be understood, however, that these examples are given by way of illustration only, and that the invention is not to be construed as limited in spirit or in scope by the details set forth. It will be apparent to those skilled in the art that many modifications in materials, conditions, and methods may be made without departing from the invention. In each of these examples, temperatures are given in degrees centigrade (° C.), amounts of materials in parts by weight, and pressures during vacuum distillation in millimeters (mm.) of mercury.

EXAMPLE 1

$\beta$ - (9 - carbazole) ethyltrimethylammonium chloride

A mixture of 501 parts of carbazol, 560 parts of pellets of potassium hydroxide and 8500 parts of toluene is stirred and heated on a steam bath while 720 parts of the hydrochloride of ($\beta$-chloroethyl) dimethylamine are added in the course of two hours. An additional quantity of 200 parts of potassium hydroxide pellets is added, and the mixture is heated for two hours longer. The reaction product is washed with water and the aqueous layer discarded. On extraction with dilute hydrochloric acid, most of the product remains insoluble. It is collected on a filter and recrystallized from isopropanol. The hydrochloride of 9-($\beta$-dimethylaminoethyl) carbazole thus obtained melts at about 241–243° C.

240 parts of this hydrochloride are reconverted to the anhydrous base by alkalization and ether extraction. The base obtained is stored with 160 parts of methyl chloride and 720 parts of anhydrous acetone at room temperature. The crystalline precipitate is collected on a filter, washed with anhydrous ether, and dried in vacuo over sodium hydroxide. The $\beta$-(9-carbazole) ethyltrimethylammonium chloride thus obtained melts at about 240° C. with decomposition. It has the structural formula

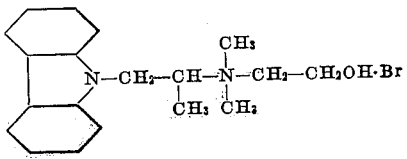

EXAMPLE 2

$\beta$ - (9 - carbazole) ethyldiethylmethylammonium iodide 167 parts of carbazole, 270 parts of ($\beta$-chloroethyl) diethylamine and 160 parts of sodium hydroxide powder are mixed and heated with stirring on a water bath for 24 hours. The product is extracted with water and then with ether. The ether extract is washed with water and then dried over anhydrous sodium sulfate. Filtration and distillation of the ether leaves the 9-($\beta$-diethylaminoethyl) carbazole. This tertiary base is distilled at 197–200° C. and 6 mm. pressure. The distillate is treated with a 50% excess of methyl iodide and permitted to stand at 0° C. until crystallization occurs. The $\beta$-(9-carbazole) ethyldiethylmethylammonium iodide, upon recrystallization from ethanol, melts at about 188–190° C.

EXAMPLE 3

$\beta$ - (9 - carbazole) propyldimethyl - ($\beta$ - hydroxyethyl) ammonium bromide A mixture of 500 parts of carbazole, 400 parts of granular sodium hydroxide and 870 parts of toluene is maintained at about 100° C. while 790 parts of the hydrochloride of ($\beta$-chloropropyl)-dimethylamine are added. The mixture is then stirred at about 80° C. for 12 hours and filtered with the aid of a filter aid while still hot. The residue is washed with toluene, and the combined toluene solutions are extracted with dilute hydrochloric acid. The extract is rendered alkaline by the addition of potassium hydroxide and extracted with ether. The ether extract is dried over anhydrous potassium carbonate, filtered, and evaporated. The residue is distilled at about 157° C. and 0.3 mm. pressure.

252 parts of the yellow, oily 9 - ($\beta$ - dimethylaminopropyl) carbazole thus obtained are reacted with 138 parts of ethylene bromohydrin in 700 parts of butanone at room temperature. The resulting oil solidifies on chilling at 0° C. The $\beta$ - (9 - carbazole) propyldimethyl - ($\beta$ - hydroxyethyl) ammonium bromide is recrystallized from isopropanol. It has the structural formula

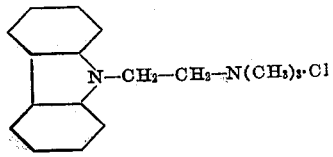

EXAMPLE 4

$\beta$ - (10 - acridan) ethylbenzyl - ($\beta$ - hydroxyethyl) methylammonium bromide A solution of phenyl lithium in 1800 parts of ether is prepared from 440 parts of bromobenzene and 40 parts of lithium. 400 parts of acridan are added portionwise at room temperature, with agitation, and then 517 parts $\beta$-chloroethyl ester of p-toluene sulfonic acid are added dropwise at room temperature in the course of 7 hours. The mixture is stirred at room temperature for 12 hours after which water is added to decompose the mixture. After several hours of stirring, the layers are separated and the ether layer evaporated on a steam bath. The 10-($\beta$-chloroethyl) acridan crystallizes on standing. The product is mixed with 750 parts of $\beta$-methylaminoethanol and 2100 parts of xylene and heated at reflux temperature for 4 days. The mixture is extracted with dilute hydrochloric acid and the extract is rendered alkaline with sodium hydroxide. The base is extracted with ether, and the ether extract is dried over anhydrous potassium carbonate, filtered, and evaporated. The 10-(hydroxyethylmethylaminoethyl)-acridan is distilled at about 205° C. and 0.3 mm. pressure. It forms a crystalline hydrochloride which melts at about 105–109° C.

282 parts of the base are reacted with 188 parts of benzyl bromide in 900 parts of acetone at 25° C. for several hours. Upon chilling, the crystalline $\beta$ - (10 - acridan) ethylbenzyl - ($\beta$- hydroxyethyl)methylammonium bromide is obtained which has the structural formula

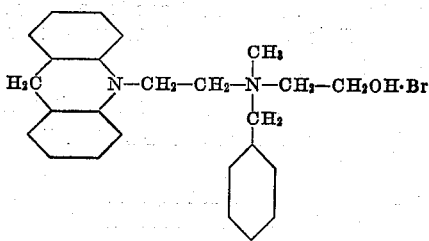

EXAMPLE 5

N-(10-acridanethyl)-N-methylpiperidinium methosulfate

To a mixture of 290 parts of acridan, 920 parts of lithium amide, and 2100 parts of xylene, 370 parts of the hydrochloride of N-(β-chlorethyl)-piperidine are added gradually at reflux temperature with stirring. The reaction is completed by heating at reflux temperature for 4 hours. The mixture is then extracted with dilute hydrochloric acid, and the extract is rendered alkaline by addition of ammonium hydroxide. The base is extracted with ether, and the extract is dried over anhydrous potassium carbonate, filtered, and evaporated. The β-(10-acridan)ethylpiperidine is distilled at 0.6 mm. pressure and about 190° C. 300 parts of this base are permitted to react at room temperature with 190 parts of dimethyl sulfate in 900 parts of butanone in a shielded pressure reactor. Upon chilling at 0° C., a precipitate forms which is recrystallized from propanol. The resulting methosulfate has the structural formula

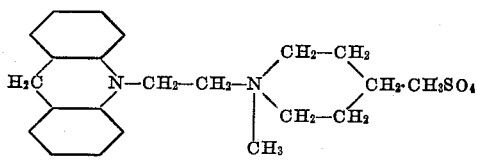

EXAMPLE 6

N-(10-acridanethyl)-N-Allylpyrrolidinium iodide

To a stirred, refluxing mixture of 290 parts of acridan, 92 parts of lithium amide, and 2100 parts of xylene, 340 parts of the hydrochloride of N-(β-chloroethyl)pyrrolidine are added portionwise and refluxed continuously for 5 hours. The mixture is then extracted with dilute hydrochloric acid. The aqueous layer is separated and rendered alkaline by addition of potassium hydroxide and extracted with ether. The extract is dried over anhydrous potassium carbonate, filtered, and evaporated. The filtrate is distilled at about 190° C. and 0.6 mm. pressure. It forms a crystalline hydrochloride which melts at about 158–162° C. 278 parts of the N-(10-acridan)ethylpyrrolidine are heated with 185 parts of allyl iodide in 1000 parts of butanone at reflux temperature for 30 minutes and then chilled at 0° C. until a crystalline precipitate forms. The latter is collected on a filter and washed with anhydrous ether. The N-(10-acridanethyl)-N-allylpyrrolidinium iodide thus obtained has the structural formula

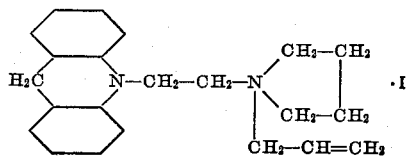

We claim:
1. The quaternary salts of the structural formula

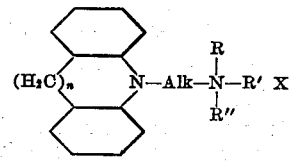

wherein n is a member of the group of numbers consisting of zero and one, Alk is a lower alkylene radical containing at least two carbon atoms, X is one equivalent of a non-toxic anion, R is a member of the class consisting of lower alkyl, benzyl, lower alkenyl and lower hydroxyalkyl radicals and R' and R'' are lower alkyl radicals.

2. The (9-carbazole)alkyltrialkylammonium salts of the structural formula

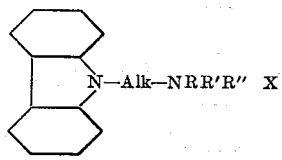

wherein Alk is a lower alkylene radical containing at least two carbon atoms, R, R' and R'' are lower alkyl radicals and X is one equivalent of a non-toxic anion.

3. The (9-carbazole)ethyltrialkylammonium salts of the structural formula

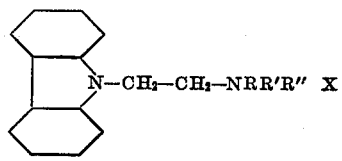

wherein R, R', and R'' are lower alkyl radicals and X is one equivalent of a non-toxic anion.

4. The (10-acridan)alkyltrialkylammonium salts of the structural formula

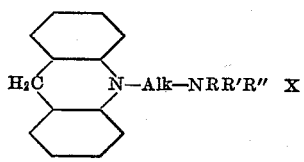

wherein Alk is a lower alkylene radical containing at least two carbon atoms, R, R', and R'' are lower alkyl radicals and X is one equivalent of a non-toxic anion.

5. The (10-acridan)ethyltrialkylammonium salts of the structural formula

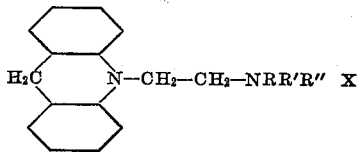

wherein R, R' and R'' are lower alkyl radicals and X is one equivalent of a non-toxic annion.

6. The non-toxic (9-carbazole)ethyltrimethylammonium salts.

7. The non-toxic (9-carbazole)ethyltrimethylammonium halides.

8. The non-toxic (9-carbazole)ethyldiethylmethylammonium salts.

9. The non-toxic (9-carbazole)ethyldiethylmethylammonium halides.

10. The (9-carbazole)alkyldialkyl-(hydroxyalkyl)-ammonium salts of the structural formula

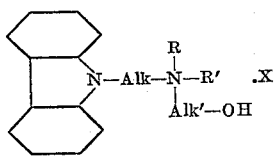

wherein Alk is a lower alkylene radical containing at least two carbon atoms, Alk' is a lower alkylene radical, R and R' are lower alkyl radicals, and X is one equivalent of a non-toxic anion.

11. The non-toxic lower (9-carbazole)alkyldimethyl-(β-hydroxyethyl)ammonium salts containing two carbon atoms between the nitrogen atoms.

12. The lower (10-acridan)alkyldialkyl-(hydroxyalkyl)ammonium salts of the structural formula

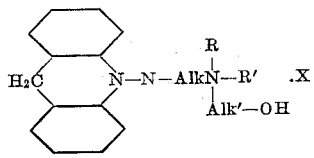

wherein Alk is a lower alkylene radical containing at least two carbon atoms, Alk' is a lower alkylene radical, R and R' are lower alkyl radicals, and X is one equivalent of a non-toxic anion.

References Cited in the file of this patent
UNITED STATES PATENTS

| Number | Name | Date |
|---|---|---|
| 2,528,162 | Mills | Oct. 31, 1950 |
| 2,528,939 | Wright | Nov. 7, 1950 |

FOREIGN PATENTS

| Number | Country | Date |
|---|---|---|
| 609,455 | Great Britain | Sept. 30, 1948 |

OTHER REFERENCES

Eisleb, Berichte, vol. 74-B, pp. 1440 and 1441 (1941).

Wiselogle, "Survey of Antimalarial Drugs, 1941–1945" (J. W. Edwards; Ann Arbor, Mich., 1946), vol. II, part I, pp 666 and 914.

Fieser et al., "Organic Chemistry" (D. C. Heath and Co., Boston; 1944); page 32.